United States Patent [19]

Vignaud

[11] Patent Number: 4,939,048
[45] Date of Patent: Jul. 3, 1990

[54] ELECTROCHEMICAL CELL HAVING AN ALKALINE ELECTROLYTE AND A ZINC NEGATIVE ELECTRODE

[75] Inventor: René Vignaud, Aulnay Sous Bois, France

[73] Assignees: Societe Anonyme dite: Wonder; Societe Anonyme dite: Cipel, both of Levallois-Perret, France

[21] Appl. No.: 380,357

[22] Filed: Jul. 17, 1989

[30] Foreign Application Priority Data

Jul. 25, 1988 [FR] France ................. 88 10015

[51] Int. Cl.$^5$ ............................. H01M 4/75
[52] U.S. Cl. .................... 429/161; 429/190; 429/211
[58] Field of Search .......... 429/211, 161, 190

[56] References Cited

U.S. PATENT DOCUMENTS 3,839,090 10/1974 Morelock et al. ............... 424/211
3,956,012 5/1976 Scholle ........................ 429/211 X Primary Examiner—Stephen J. Kalafut
Attorney, Agent, or Firm—Sughrue, Mion, Zinn, MacPeak & Seas

[57] ABSTRACT

An electrochemical battery having an alkaline electrolyte and a gelled negative electrode containing zinc powder free from mercury, cadmium, and lead, and 1 ppm to 1000 ppm of at least one organic stabilizer compound selected from polyfluorine compounds of the ethoxyl fluoroalcohol type and compounds of the alcoyl sulfide and polyethoxyl alcohol type, the electrode being provided with a negative current collector immersed in the gell and connected to the negative terminal, wherein the current collector comprises a bundle of conducting fibers which are fixed together at their ends closest to the negative terminal, the fibers having a diameter lying in the range 0.05 mm to 1 mm, and being constituted, at least superficially, by a metal selected from: indium; gallium; cadmium; and pure zinc.

7 Claims, 2 Drawing Sheets

FIG. 1
FIG. 2
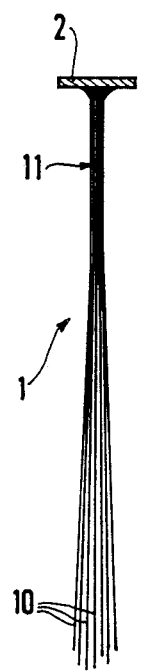
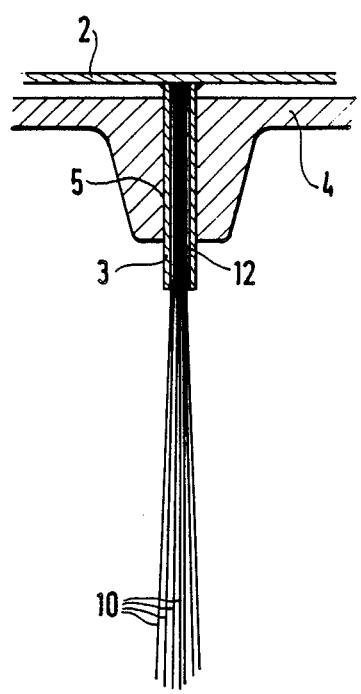

ELECTROCHEMICAL CELL HAVING AN ALKALINE ELECTROLYTE AND A ZINC NEGATIVE ELECTRODE

The present invention relates to electrochemical cells having an alkaline electrolyte and zinc negative electrodes, and it relates particularly to alkaline primary cells or "batteries" of one of the following types: zinc-/manganese dioxide; zinc/silver oxide; and zinc/air; in which the negative electrode is corrodable by the alkaline solution.

BACKGROUND OF THE INVENTION

Although such batteries enable high energies to be obtained, their stability is fairly low because their negative electrodes are corrodable by reaction in the alkaline electrolyte which means that the battery looses capacity during storage because the electrode is partially dissolved in the electrolyte. Continuous and considerable evolution of gaseous hydrogen also occurs, thereby causing electrolyte to ejected and sometimes even giving rise to gas pressures that burst the battery's safety valve. The magnitude of these harmful phenomena increases with increasing temperature, e.g. when batteries are stored in a hot country.

In order to avoid these phenomena, all battery manufacturers have for years been amalgamating their zinc electrodes, and sometimes also adding cadmium or lead thereto. Mercury and lead are simple and effective means for reducing the overvoltage at which hydrogen is given off, in other words for avoiding zinc corrosion, with cadmium additionally serving to improve conduction. The zinc electrode is thus constituted by a gelled mixture of amalgamated zinc powder containing lead and cadmium powder and an alkaline solution of concentrated potassium hydroxide. A current collector constituted by a metal cylinder is plunged into this electrode.

The quantities of mercury, cadmium, and lead used in each battery are small, but there exists abundant and worrying literature concerning the dangers of dispersing these elements in the environment and the very serious risk of them finding their way into the food chain. When consumers throw batteries away, the batteries suffer two types of fate: either they accumulate in tips or land fills, in which case the can of the battery retains the battery contents for a certain time, after which it corrodes and the active substances, including mercury, are leached by ground water; or else the batteries are incinerated in which case the mercury distills and escapes with the smoke into the atmosphere prior to recondensing roundabout. In either case mercury gets into the environment.

Although it is sometimes recommended that worn-out batteries containing mercury, cadmium, or lead should be recycled, this does not appear to be an ideal solution since it would inevitably lead to the creation of concentrated waste which would be even more dangerous to take care of.

Thus, looking beyond regulations which require the content of these metals in batteries to be reduced, it is essential to find ways of omitting them altogether. However, since a low content of mercury (less than 3% by weight relative to the zinc) is already not enough on its own to ensure battery conservation, several replacement solutions have already been tried.

Some of the more effective solutions have already been proposed by the present Assignee. Thus, French patent number FR-A-2 567 328 describes a method of stabilizing a zinc electrode by incorporating a stabilizer at a concentration lying in the range 0.01% to 1% by weight of zinc, said stabilizer being constituted by an organic polyfluoride compound of the ethoxyl fluoroalcohol type. In addition, in French patent application No. FR-A-2 583 580, the Assignee has proposed another compound of the alcoyl sulfide and polyethoxyl alcohol type at a concentration of 0.001% to 1% by weight. In both the above two cases, it has been observed that although the problem of zinc corrosion is solved, there is also a drop in the level of the battery discharge voltage, and that this drop increases with increasing demand, i.e. with increasing current.

The objet of the present invention is to avoid this drawback and provide a "clean" alkaline primary cell having a zinc negative electrode, in other words a battery containing no mercury, no cadmium, and no lead, but having the same performance as a battery in which the zinc is 5% amalgamated.

SUMMARY OF THE INVENTION

The present invention provides an electrochemical cell having an alkaline electrolyte and a gelled negative electrode containing zinc powder free from mercury, cadmium, and lead, and 1 ppm to 1000 ppm of at least one organic stabilizer compound selected from polyfluorine compounds of ethoxyl fluoroalcohol and compounds of alcoyl sulfide and polyethoxyl alcohol, said electrode being provided with a negative current collector immersed in the gell and connected to the negative terminal, wherein said current collector comprises a bundle of conducting fibers which are fixed together at their ends closest to the negative terminal, said fibers having a diameter lying in the range 0.05 mm to 1 mm, and being constituted, at least superficially, by a metal selected from the group consisting of indium; gallium; cadmium; and pure zinc.

The fibers have a base of a material selected from brass; pure copper; pure zinc; and cadmium.

The length of the fibers depends on the size of the battery concerned. Their diameter is preferably in the range 0.1 mm to 0.6 mm.

By way of example, the collector may include about 10 fibers having a diameter of 0.3 mm, or about 100 fibers having a diameter of 0.1 mm.

In a preferred embodiment, said negative electrode is surmounted by a sealed plug through said current collector passes, and said conducting fibers are clamped in a cylindrical sleeve where the collector passes through the plug.

The sleeve may be made of a material selected from the group consisting of polyethylene; and polypropylene.

It may alternatively be made of the same material as the conducting fibers.

In this case it is in electrical connection with the negative terminal.

A sealant is preferably provided between the fibers and said sleeve and between the sleeve and the corresponding walls of said plug, said sealant being selected from the group consisting of epoxy resin; pitch; and viscous hydrocarbons.

BRIEF DESCRIPTION OF THE DRAWINGS

Implementations of the invention are described by way of example with reference to the accompanying drawings, in which:

FIG. 1 is a diagram in partial section through a current collector of a battery of the invention;

FIG. 2 is a diagram in partial section through a variant current collector of a battery of the invention.

DETAILED DESCRIPTION

Figure 3:
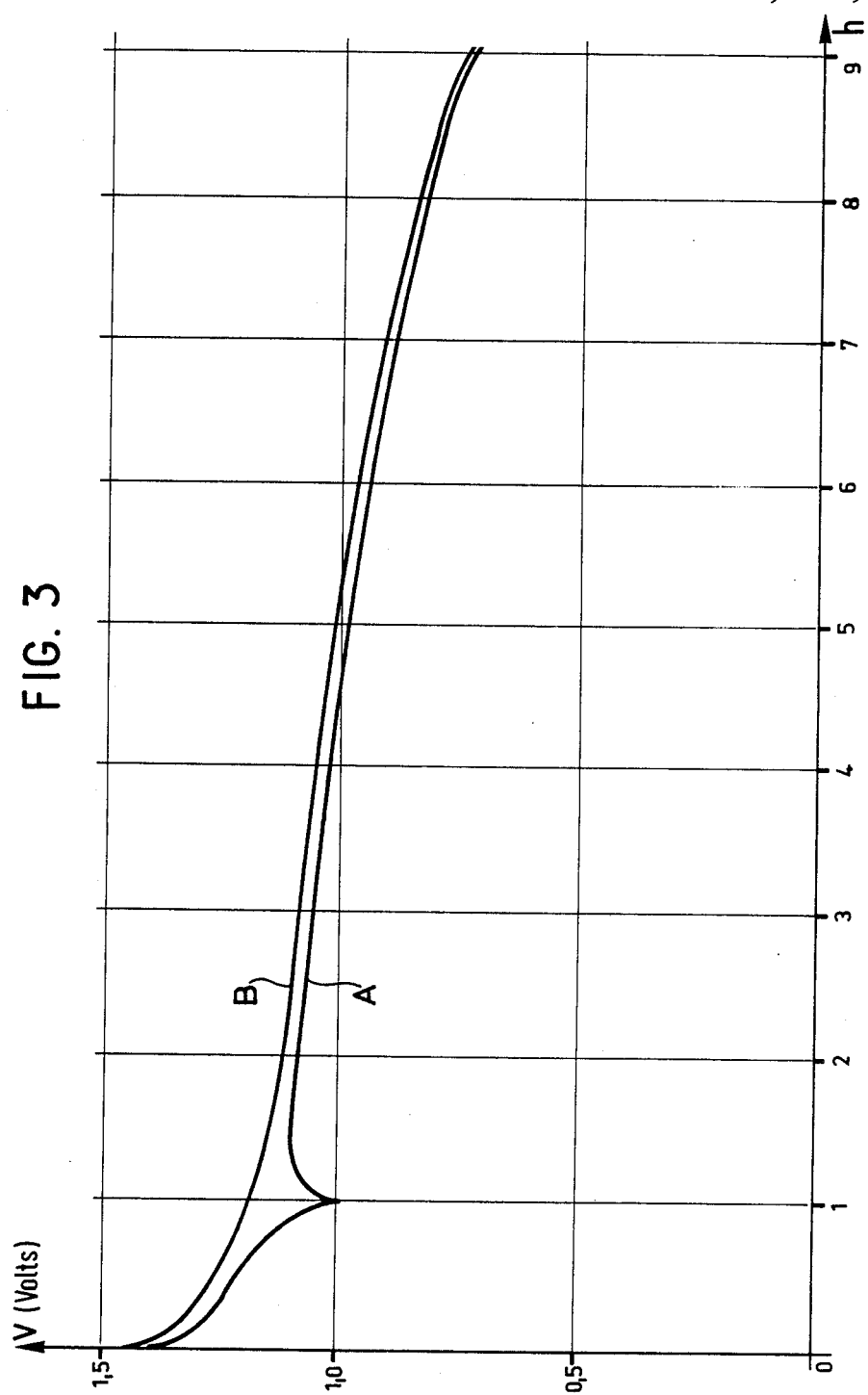
FIG. 3 is a graph showing the discharge curve of a prior art battery and of a battery in accordance with the invention.

A "clean" prior art battery A was prepared including a negative electrode made as follows:

An alkaline electrolyte solution was inserted into a mixer, said solution being a potassium hydroxide solution saturated with zinc oxide, together with a gelling agent constituted by carboxymethylcellulose. While the mixer was rotating, zinc powder free from cadmium, mercury, or lead was added, followed by the organic stabilizer compound. Suitable stabilizer compounds are those described in the Assignee's French patents numbers. FR-A-2 567 328 and FR-A-2 583 580. A typical concentration is 50 ppm of $C_6F_{13}C_2H_4(C_2H_4O)_{14}OH$. The anode gell was ready after harmonizing for several minutes.

The negative current collector connected to the negative terminal was constituted by a "nail", in other words a metal cylinder of brass or copper having a diameter of about 1 millimeter.

A battery of this type made up to R6 size was discharged under severe conditions through a resistance of 5 ohms. The corresponding curve A shown in FIG. 3 (V in volts and h in hours) shows disturbances during discharge, with a very large ohmic drop after one hour. This ohmic drop sometimes happens again. It may be spontaneous, or else it may be triggered by a shock.

A battery B of the invention was also prepared. Its negative electrode was identical to that of battery A, but its current collector was constituted by a collector 1 as shown in FIG. 1. Such a collector comprises a plurality of indium-covered copper fibers 10 whose ends 11 are pressed together to constitute a solid cylindrical zone connected to the negative terminal 2. These fibers are a few centimeters long. They are 0.3 mm in diameter and each bundle comprises 10 fibers.

For a total volume equivalent to the nail of battery A, the collector of battery B had a much larger surface area in contact with the active mass. Discharge curve B also shown in FIG. 3 shows that there is no disturbance during discharge, and also that there is no loss of capacity compared with "dirty" prior art batteries, i.e. batteries having an amalgamated zinc electrode.

In addition, the collector of the invention is flexible enough to reduce its sensitivity to shock considerably. Naturally, for a given volume taken up within the electrode, it would be possible to use 100 fibers having a diameter of 0.1 mm. However this is a limiting value for reasons of mechanical strength of the fibers under conditions of use.

In the variant of FIG. 2, the conducting fibers 10 of brass, copper, or electrolytic zinc and preferably covered with indium are held at one of their ends 12 in a cylindrical metal sleeve 3. The sleeve is bonded to terminal 2. The sleeve may be made of brass or copper and has the same diameter as the nail-shaped current collector of battery A. The sleeve 3 goes through a plastic plug 4 via a cylindrical passage 5. Sealing may be obtained by using a sealant such as epoxy resin, pitch, or a viscous hydrocarbon, disposed between the wall of the passage 5 and the sleeve 3, and between the sleeve 3 and the ends 12 of the fibers.

The discharge curve obtained using a collector as shown in FIG. 2 is analogous to that of battery B (curve B).

In another variant, the sleeve is made of plastic material and it is the ends 12 which are directly bonded to the terminal 2.

I claim:

1. A electrochemical cell having an alkaline electrolyte and a gelled negative electrode containing zinc powder free from mercury, cadmium, and lead, and 1 ppm to 1000 ppm of at least one organic stabilizer compound selected from polyfluorine compounds of ethoxyl fluoroalcohol and compounds of alcoyl sulfide and polyethoxyl alcohol, said electrode being provided with a negative current collector immersed in the gell and connected to the negative terminal, wherein said current collector comprises a bundle of conducting fibers which are fixed together at their ends closest to the negative terminal, said fibers having a diameter lying in the range of 0.05 mm to 1 mm, and being coated by a metal selected from the group consisting of indium; gallium; cadmium; and pure zinc.

2. An electrochemical battery according to claim 1, wherein said fibers are formed of a base metal selected from the group consisting of cadmium, pure zinc, pure copper, and brass.

3. A battery according to claim 1, wherein said negative electrode is surmounted by a sealed plug through which said current collector passes, said conducting fibers being clamped in a cylindrical sleeve located where the current collector passes through the plug.

4. A battery according to claim 3, wherein said sleeve is made of a polymer material selected from the group consisting of polyethylene; and polypropylene.

5. A battery according to claim 3, wherein the sleeve is made of metal and of the same material as said fibers.

6. A battery according to claim 5, wherein the sleeve is in electrical connection with the negative terminal.

7. A battery according to claim 3, wherein a sealant is provided between the fibers and said sleeve and between the sleeve and the corresponding walls of the plug, said sealant being a material selected from the group consisting of epoxy resin; pitch; and viscous hydrocarbons.

* * * * *